US009730101B2

(12) United States Patent
Zhang

(10) Patent No.: US 9,730,101 B2
(45) Date of Patent: Aug. 8, 2017

(54) SERVER SELECTION IN COMMUNICATIONS NETWORK WITH RESPECT TO A MOBILE USER

(75) Inventor: Shunliang Zhang, Beijing (CN)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 118 days.

(21) Appl. No.: 14/374,361

(22) PCT Filed: Mar. 15, 2012

(86) PCT No.: PCT/CN2012/072347
§ 371 (c)(1),
(2), (4) Date: Jul. 24, 2014

(87) PCT Pub. No.: WO2013/113181
PCT Pub. Date: Aug. 8, 2013

(65) Prior Publication Data
US 2014/0355542 A1 Dec. 4, 2014

(30) Foreign Application Priority Data

Jan. 31, 2012 (WO) ................ PCT/CN2012/070806

(51) Int. Cl.
*H04W 28/02* (2009.01)
*H04W 4/02* (2009.01)
*H04W 4/00* (2009.01)

(52) U.S. Cl.
CPC ....... *H04W 28/0215* (2013.01); *H04W 4/001* (2013.01); *H04W 4/027* (2013.01); *H04W 4/028* (2013.01)

(58) Field of Classification Search
None
See application file for complete search history.

(56) References Cited

U.S. PATENT DOCUMENTS

| 8,837,418 | B2* | 9/2014 | Smith | .................. H04W 72/08 370/252 |
| 2009/0228954 | A1* | 9/2009 | Hu | ........................ H04L 63/102 726/1 |
| 2010/0121960 | A1* | 5/2010 | Baniel | ..................... H04L 47/10 709/228 |

(Continued)

FOREIGN PATENT DOCUMENTS

| CN | 101022637 A | 8/2007 |
| CN | 101577935 A | 11/2009 |

*Primary Examiner* — Donald Mills
(74) *Attorney, Agent, or Firm* — Patents on Demand P.A.; Brian K. Buchheit; Scott M. Garrett

(57) ABSTRACT

The invention refers to providing a service associated to a service request received from a mobile user equipment —UE— (10), the communications network comprising a plurality of service nodes (21a-21h), the communications network (1) receives (S2) a service request from a requesting UE (10), obtains mobility information associated to the UE (10), selects a service node (21) from the plurality of service nodes (21, 21') in dependency of the mobility information, and transmits (S3) a response to the UE indicative of the selected service node (21) to be contacted for providing the service. The invention further refers to a gateway node and a method performed by the gateway node, a policy server and a method performed in the policy server and to corresponding programs.

10 Claims, 4 Drawing Sheets

(56) References Cited

U.S. PATENT DOCUMENTS

| | | | |
|---|---|---|---|
| 2011/0063977 A1* | 3/2011 | Halfmann | H04L 47/10 370/235 |
| 2011/0090852 A1* | 4/2011 | Ramle | H04W 48/20 370/328 |
| 2011/0246586 A1* | 10/2011 | Steele | H04L 12/14 709/206 |
| 2013/0144979 A1* | 6/2013 | Kansal | H04N 21/23106 709/219 |
| 2014/0022897 A1* | 1/2014 | Rajagopalan | H04W 28/0215 370/230 |
| 2015/0043429 A1* | 2/2015 | Kim | H04W 4/008 370/328 |
| 2016/0134688 A1* | 5/2016 | Bugenhagen | G08B 25/08 709/203 |

* cited by examiner

SERVER SELECTION IN COMMUNICATIONS NETWORK WITH RESPECT TO A MOBILE USER

CROSS REFERENCE TO RELATED APPLICATION(S)

This application is a 35 U.S.C. §371 National Phase Entry Application from PCT/CN2012/072347 filed Mar. 15, 2012, which claims foreign priority to PCT/CN2012/070806 filed Jan. 31, 2012, the disclosures of which are incorporated by reference herein.

TECHNICAL FIELD

The present invention relates server selection supported by a mobile network and especially refers to a server selection in a Content Distribution Network —CDN—.

BACKGROUND

Recently, due to the quick growth of smart phone penetration, data traffic on mobile network is experiencing significant growth. At the same time, more affordable service and application are expected by end users. Therefore, many operators are facing the challenge to offload their overloaded networks and reduce the transport and peering cost. Facing this situation, so-called Content Distribution Networks have been proposed attracting more and more attention. When introducing Content Distribution Network —CDN— system into mobile networks, also being referred to as mobile CDN, there are many potential issues. One important issue is how to select an appropriate CDN server to serve a moving mobile terminal or user equipment —UE— by considering mobile network specific characteristics, such as UE movement.

First of all, in contrast to CDN being realized in fixed networks where the IP address is usually used as location info, in mobile networks, the same IP address is allocated to a UE when roaming under the same P-GW/GGSN, e.g. all UEs under the same P-GW/GGSN get allocated an IP address from the same sub-network. Hence, for mobile UEs, the IP address might not be sufficiently effective to be used as location info to find an appropriate CDN server, also being referred to as CDN Distribution Node —CDN DN—, when some CDN DNs are deployed below Gi (UMTS)/SGi (EPS) interface (in other words, inside of mobile networks). A further issue might to be considered when selecting a CDN DN to serve a moving UE: the closer a CDN DN is to the UE, the better with respect to transport bandwidth saving and latency reduction. On the other hand, there is an increasing risk of CDN DN relocation and service interruption for the moving UE.

In case an CDN server below Gi/SGi is selected, the existing mobility management mechanism of 3GPP networks may not be appropriate to ensure the service continuation for moving terminals like that of SIPTO/LIPA situation.

An introduction of CDN into mobile networks might mean that some CDN DNs are deployed in mobile networks, i.e. below Gi/SGi interface, and some other CDN DNs are deployed above Gi/SGi interface. Generally, above Gi/SGi refers to a CDN DN being deployed outside of the mobile network and below Gi/SGi refers to a CDN DN within or comprised by the mobile network. In case of a CDN DN below Gi/SGi, this CDN DN can be deployed in the radio access network (RAN) or the core network (CN). One issue thereof might be related to security and charging, e.g. the CDN CN selecting an appropriate edge node to serve a specific moving UE. For example, due to security requirements, for a UE, certain media content might not be allowed to be provided by an CDN server below SGi/Gi interface although the gains may be bigger from performance point of view. In addition, due to requirement of lawful interception or charging, for some UEs, an CDN server located in CN instead of a CDN DN located in RAN is preferred to be used to serve the mobile UE.

One important issue of CDN system is the CDN server selection. Currently, several typical approaches are used by typical CDN providers, such as DNS based, HTTP redirection or URL rewriting. A recent proposal/realization of a server selection proposes a GSLB (global service load balancer function) of a CDN provider selecting the best service node for a UE based on IP address of a local DNS server which is usually associated with the UE IP address, and, and other info such as resource status of service node, link status from UE to service node, etc. The SLB locally selects the specific cache node to serve the UE by various mechanisms such as HTTP redirection, URL rewriting. In other words, the central control system CDN CN selects an edge server by GSLB at macro level. The SLB located in the CDN Edge server/node will select locally which Cache will be used to the UE at micro level. Several local caches may be transparent to out side of the CDN edge server from IP level. Several Caches may share the same public IP address to outside UEs such that only the CDN Edge server/node knows the internal topology of local Cache nodes controlled by it.

However, the above-described mechanism has been developed with a focus to fixed networks rather than to mobile network requirements.

SUMMARY

It is an object of the present invention to improve existing service node selection taking the mobile network specific issues into account.

This object is achieved by the independent claims. Advantageous embodiments are described in the dependent claims.

According to first embodiment, a selection of an appropriate data service node within a communications network is proposed, wherein the communications network comprises a data service network to serve service data or content requests originating from user equipments and a mobile network to assure a communications network connection to mobile users. The data service network comprises a plurality of (data) service nodes (that might have stored or cached data content and/or applications of associated to a service) e.g. locally distributed over the communications network (e.g. covering a certain geographical area), a gateway node for interworking between the PDN and the mobile network (thus terminating the data traffic both with the PDN and the mobile network), and a policy server for enforcing/determining policy rules within the communications network. In response to detecting by the gateway node a service request (e.g. in form of a domain name system —DNS— request) of a UE, the gateway node sends a selection policy request to the policy server, the request comprising mobility information associated to the UE (e.g. information indicative of at least one of: an actual location, location history, actual speed, mobility history of the UE, request content/service/application driven from the DNS request, related URL info, and in response thereto receives a selection policy response comprising information indicative of one or a plurality of service nodes that can be used in order to support a service node selection.

In an embodiment, the data network is a so-called CDN network comprising a plurality of CDN service nodes and a central node. The CDN service nodes are also being referred to as CDN cache nodes or edge nodes, and the central node is also being referred to as central CDN server comprising GLSB functions.

The CDN network might be a service network and/or a content distribution networks. A central CDN control node or CDN CN might be logically part of the CDN network although being physically part of the core network, or the mobile network.

In a further embodiment, the gateway node is a packed data gateway, e.g. a so-called Packet Data Network Gateway (P-GW) or Gateway GPRS Support Node (GGSN) and the policy server is a so-called PCRF.

According to a further embodiment performing the following steps:
  detecting the DNS request from a UE comprising information indicative of the requested content (content.site.com),
  sending a request to a PCRF to ask for a CDN distribution node selection policy (comprising requested content info, UE ID, location info, and/or access network info),
  receiving a response message from the PCRF comprising policy information indicative of which CDN distribution node can be used,
  enriching the received DNS request received from the UE with additional information based on the response from the PCRF, to assist the CDN system for edge node selection (e.g. edge server selection policy, UE mobile network related location info (such as cell ID, base station ID, RAC, TAC, or (CAC) caching area code), UE mobility info (such as location, speed and/or history), (location and/or mobility information)
  receiving, in response to the enriched DNS, a DNS response indicative of a one or a plurality of selected service nodes.

According to the preceding embodiment, the PCRF might perform the following steps:
  receiving a request from the P-GW asking for a CDN distribution node selection policy (comprising requested content info, UE ID, location info, and/or access network info),
  generating CDN distribution node selection policy for a UE based on information from P-GW and e.g. predefined policy of mobile network operators
  sending a response message to the P-GW comprising the policy information indicative of which CDN distribution node can be used, According to the same preceding embodiment, a central resource balancing node (GLSB) might perform the following steps:
  receiving a DNS request from the DNS associated to the DNS request sent by the UE,
  selecting one or a plurality of appropriate service nodes to serve the UE based on the additional location and/or mobility info provided by mobile network taking into account UE mobility information (e.g. for a low speed moving UE, a service edge node closer to UE might be selected, i.e. an edge node located in RAN and for a high speed moving UE, a service node closer to Gi/SGi might selected, i.e. an edge node located in CN or above Gi/SGi), and
  sending the DNS response comprising an address information of the selected/local DNS distribution node.

According to a further embodiment, in case that an edge node located in mobile network shall be selected, the GSLB dos not select just one edge node but provides a list of candidate edge nodes (e.g. arranged by priority) to the mobile network that determines the most appropriate one being in line with mobile network operators' policy). The P-GW or GGSN selecting an appropriate edge node from the list based a response message received from the PCRF comprising policy information indicative of which CDN distribution node can be used.

In an embodiment, The UE actively enriches the DNS request message with mobility information (mobile network related location).

Alternatively, the P-GW/GGSN might intercept the DNS request message from a UE and enrich it with the mobility information (location information) before sending the message to DNS system.

As the SGSN or MME keeps the accurate UE location at cell level for an active UE, the P-GW or GGSN can retrieve or request the SGSN/MME to report the UE location info to it.

Further, the RAN might keep UE moving history information (for example, at a time t1, the UE performed a handover from cell A to cell B (this can be inter-RAT HO), and at time t2, the UE performed a handover from cell B and cell C. Based on this history information, it might be possible to derive a speed of the moving UE. The P-GW or GGSN might retrieve this information from the RAN. The P-GW or GGSN might know further macro level mobility activity of a UE based on Inter-SGSN or Inter-S-GW handover history records.

During the selection process, the moving speed, and/or moving history of the UE might be taken into account. In an embodiment, for a low speed moving UE, a service edge node closer to UE is selected, i.e. an edge node located in RAN, and for a high speed moving UE, a service node closer to Gi/SGi may be selected, i.e., an edge node located in CN or an edge server located above Gi/SGi is selected.

Compared with existing mechanism designed for fixed CDN system, the invention allows selecting an optimized edge node with respect to a mobile UE (e.g. located in mobile network of the UE).

Further embodiments of the invention allow the mobile network operator to influence the edge node selection process for a mobile UE in case the edge node is located in the mobile network.

The present invention also concerns computer programs comprising portions of software codes in order to implement the method as described above when operated by a respective processing unit of a user device and a recipient device. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
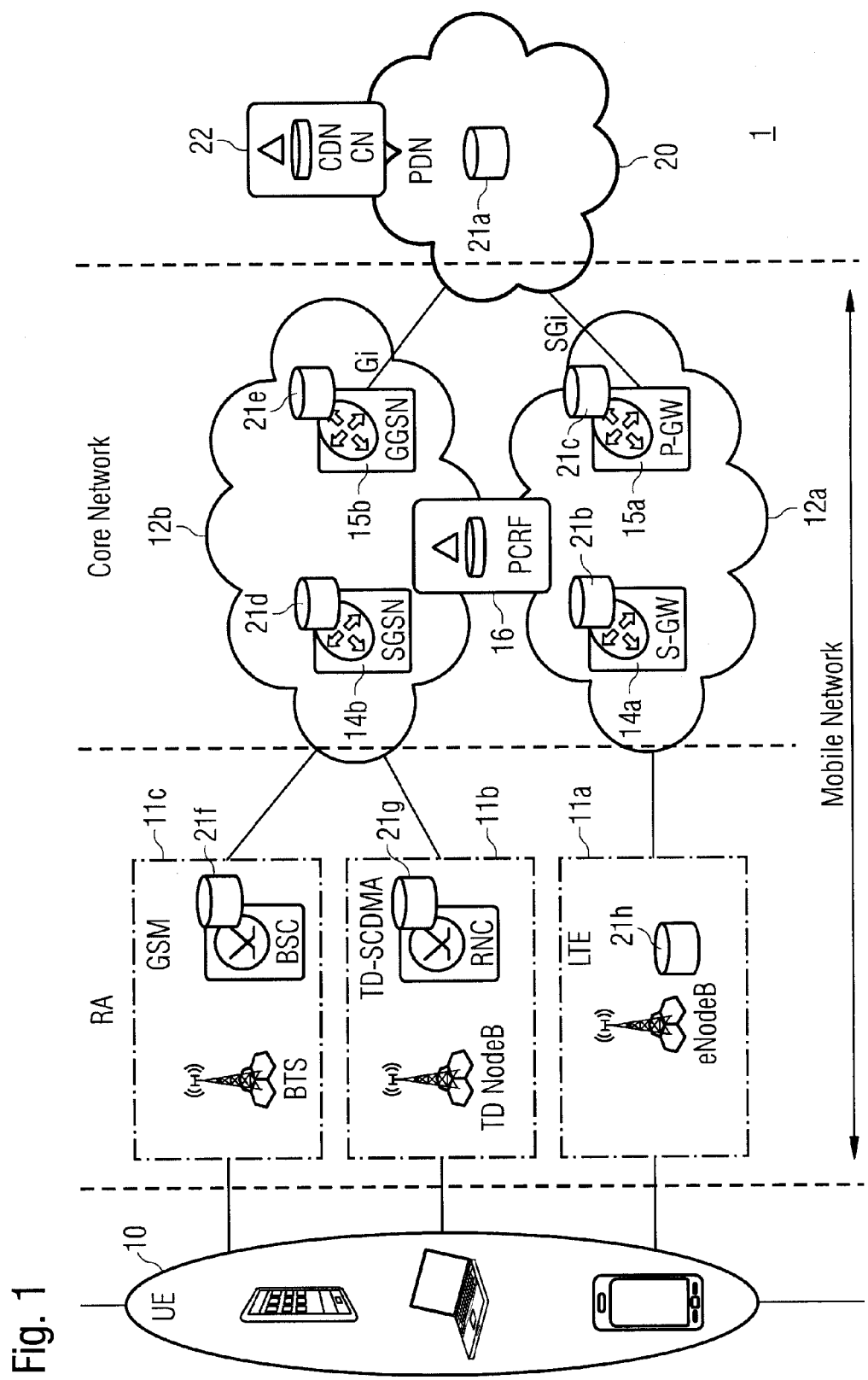
FIG. 1 shows a user terminal and communications network for performing an edge node selection.

FIG. 1 shows a principle block diagram with a communications network 1 and a mobile user equipment 10 being connected to the communications network. The communications network comprises a mobile network and a packed data network —PDN— 20.

The mobile network is divided into a radio access network RAN part and a core network CN part. The RAN part by way of example comprises a GSM RAN 11c, an UMTS Terrestrial Radio Access Network 11b, also being referred to as UTRAN, and an LTE RAN 11a, also being referred to as evolved UMTS Terrestrial Radio Access Network (eU-TRAN).

The core network may accordingly comprise a GPRS (General packet radio service) core network 12b and a so-called evolved packet system (EPS) 12a.

The GPRS core network 12b exemplarily shows a so-called Serving GPRS Support Node (SGSN) 14b and a so-called Gateway GPRS Support Node (GGSN) 15b. The SGSN 14b is responsible for the delivery of data packets from and to the UE 10 over the UTRAN 11b. Its tasks might include packet routing and transfer, mobility management (attach/detach and location management), logical link management, and authentication and charging functions. The GGSN 15b is responsible for the interworking between the GPRS network and the external packet switched networks (here the PDN 20), thus terminating the GPRS network (by means of the so-called Gi interface according to 3GPP) to the packet data network 20.

The EPS 12a exemplarily shows a serving gateway S-GW 14a, and a Packet Data Network Gateway P-GW 15a.

The S-GW 14a is a gateway which terminates the mobile network towards the eUTRAN 11a. Amongst other functions, this gateway serves as a local mobility anchor (e.g. with respect to eUTRAN's eNodeB handover).

The EPS 12a may further comprise a mobility management entity —MME— (not shown) for managing the mobility of the UE 10 allowing to access network services anywhere, as well as to continue their ongoing communication and to access network services anywhere. It is further involved in the bearer activation/deactivation process and is also e.g. responsible for choosing the S-GW for the UE.

The P-GW 15a terminates the mobile network by means of the so-called the SGi interface towards a packet data network —PDN— and is thus responsible for an interworking between a mobile packet data network and the PDN.

The core network further comprises a policy server 16 that might interact both with the GPRS core network 12b and the EPS 12a. The policy server by way of example comprises a so-called Policy and Charging Rules Function (PCRF) according to 3GPP. The PCRF is a function determining policy rules in a multimedia network in real-time. Amongst other functions, the PCRF is able to access data bases, e.g. subscriber databases and specialized functions, such as charging.

The Packet Data Network —PDN 20 is a so-called content delivery network or content distribution network (CDN). The service nodes 21a-21h, in the following also being referred to as edge nodes, edge servers or (local) CDN distribution nodes 21a-21h, locally distributed within a certain geographical area, might have stored copies of the same data.

The CDN distribution nodes 21a-21h, also being referred e.g. as CDN cache nodes, cache nodes, edge nodes or edge servers, may be placed at various locations of the network and may be physically associated to different parts of the network. FIG. 1 shows an exemplary distribution of an exemplary number of CDN distribution nodes. e.g. CDN distribution nodes 21g-21f being part of/associated to the radio access networks part, CDN distribution nodes 21b-21e being part of/associated to the core network part and CDN distribution node 21a being part of/associated to the PDN 20. Nevertheless, the CDN distribution nodes may be regarded as logically belonging to the PDN 20, being controlled central CDN server 22.

The central CDN server or control node 22 comprising global load balancing functionality, in the following also being referred to as GSLB 22, comprises functions for balancing the CDN resources (e.g. balances the load with respect to the different edge servers) by selecting an edge server or supporting an edge server selection with respect to a request from the UE.

The user equipment (UE) 10 is a radio terminal being capable of connecting to at least one of the above described radio access networks 11a-11c and further being capable of data processing and of requesting a data content/service.

The following description will focus on edge node selection in an EPC core network. Consequently, the P-GW 15a serves as gateway node that terminates the EPC by means of the so-called the SGi interface towards the packet data network —PDN— 20. Further the policy node might be realized as above-described PCRF node. As apparent from the preceding description, the same principles may be applied to different networks, e.g. to the GPRS core network as described above (wherein the GGSN serves as gateway node).

Figure 2A:
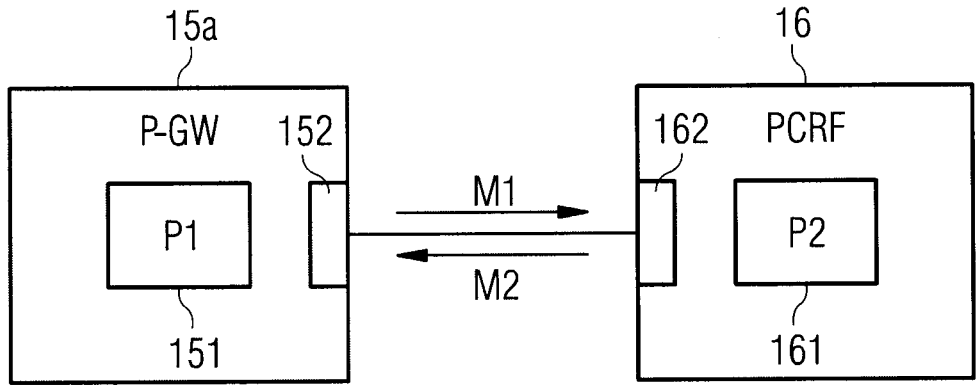
FIG. 2a shows a policy server and a gateway node of the communications network of FIG. 1.

FIG. 2a generally shows a gateway node, being exemplarily realized as P-GW 15a, and a policy server, being exemplarily realized as PCRF (node) 16, in more detail. The P-GW 15a comprises a first processor 151 and a first interface 152. The PCRF (node) 16 comprises a second processor 161 and a second interface 162. Both the first interface and the second interface are connected such that the first processor and the second processor can communicate by means of control messages. The first processor is adapted to obtain mobility information of the UE 10 and to generate a policy request message M1 comprising the mobility information and to process a policy response M2 received from the policy server 15, to support a selection of an appropriate service node out of a plurality of service nodes 21a-21h to serve the UE 10. The second processor 161 generates the policy response message M2 in dependency of the mobility information.

Figure 2B:
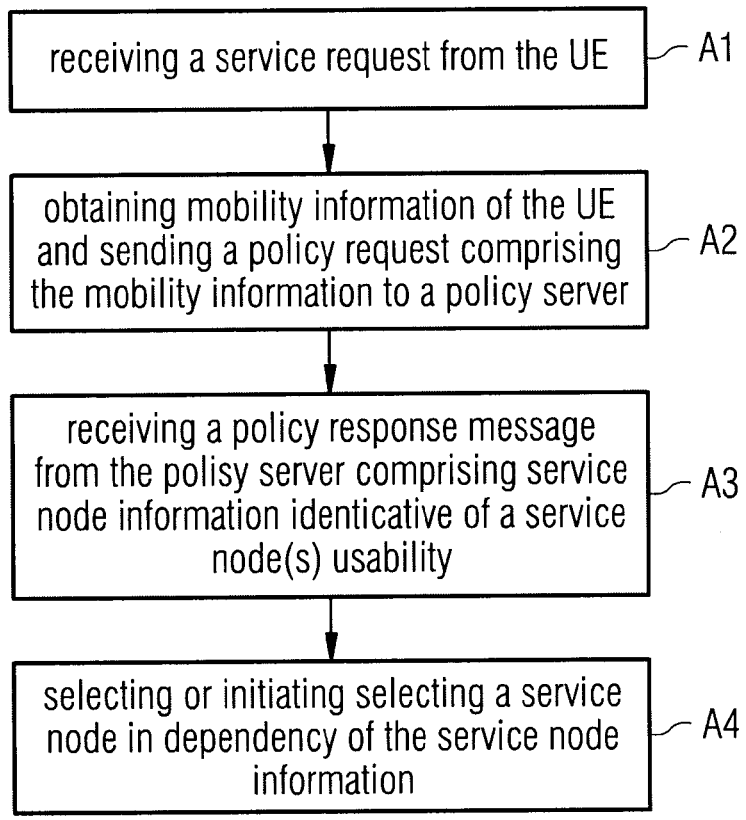
FIG. 2b shows principle method steps performed in the gateway node while interacting with the policy server.

FIG. 2b shows principle method steps performed in the gateway node 15a according to FIG. 2a:

In a first step 1A, the gateway node receives a service request from the UE 10,

In a second step 2A, the gateway node obtains mobility information of the UE and sends a policy request comprising the mobility information to the policy server, In a third step 3A, the gateway node receives a policy response message from the policy server comprising service node information indicative of a usability of one or a plurality of service nodes, and In a fourth step 4A, the gateway node selects or initiates selecting a service node from in dependency of the service node information.

In the following FIG. 3 and FIG. 4, the functions and interactions of the afore-described nodes will be explained in more detail by means of exemplary sequence diagrams.

Not being shown in FIG. 1, the described sequences involve a Domain Name System (DNS) 23. The DNS is a (hierarchical distributed) naming system for computers, services, or any resource connected to the data network. It translates domain names (meaningful to humans) into the numerical identifiers (IP addresses) associated with networking equipment for the purpose of locating and addressing these devices worldwide and unambiguously.

Figure 3:
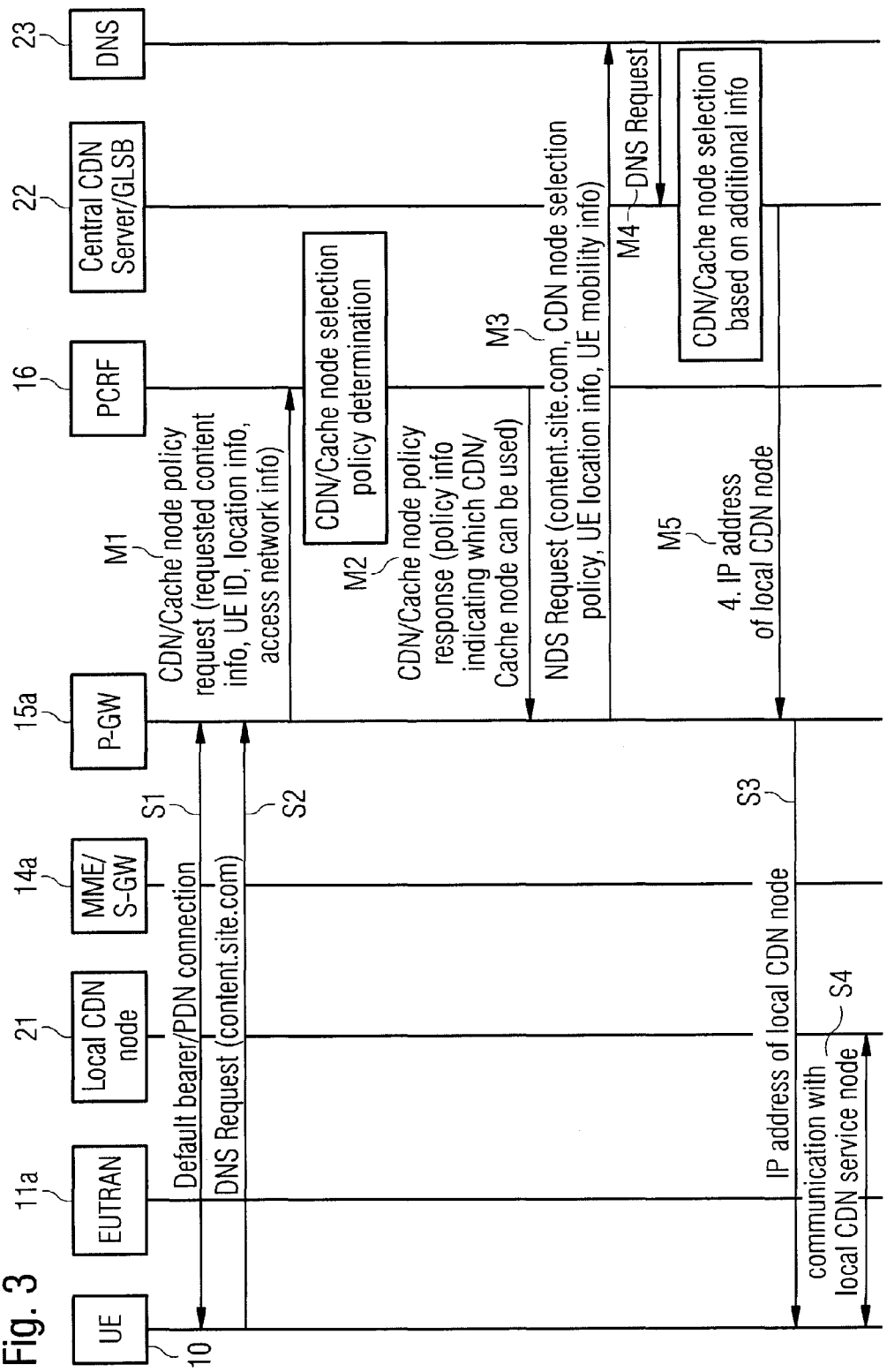
FIG. 3 shows a first exemplary sequence diagram for an edge node selection with assistance of a mobile network.

FIG. 3 shows an exemplary sequence diagram with messages S1-S4 and M1-M5 exchanged within the communications network 1 illustrating an edge node selection with assistance of a mobile network:

Upon an establishment of a default bearer (PDN Connection) S1 between the UE 10 and the gateway node (P-GW) 15a, the UE 10 initiates a DNS request message S2 to get the IP address of an appropriate content server/local CDN (distribution) node or edge server 21 (it is to be noted that local cache servers might be collocated or closely deployed in a local area that is closer to UE than the gateway node. Thus, the local CDN node may select locally which specific cache server is used to serve the UE).

As an option, the UE may enrich the DNS message additionally with mobility information (actual location, actual speed, history of location, history of speed) cell ID, base station ID, RAC, TAC, or (CAC) caching area code in order to further assist or enable the DNS system to find an appropriate server to serve the UE (alternatively, the gateway node 15a might intercept the DNS request message from a UE and enrich it with the additional mobility info).

The gateway node 15a detects the DNS request from a mobile UE (e.g. based on DPI function). Then the gateway node 15a initiates a process to request an applicable edge node selection policy for the UE 10 regarding the related content/service by sending a request message M1 to the policy server (PCRF) 16. This message may include information indicative of the UE ID, the requested content/service, and/or UE mobility location.

Upon reception of the request message M1, the PCRF 16 generates an edge node selection policy relating to the UE by considering UE mobility information (e.g. location), requested content/service, and possible subscription information (e.g. information of which content or class of content the UE has a subscription). The selection policy might comprise information about local CDN nodes 21 located in the mobile network (MN) that can and/or can't be selected. The selection policy might comprise information about cache node(s) located in the radio access network (RAN) (whether such node can/can't be used for the UE with the request content).

The PCRF 16 provides the UE related edge node selection policy to the gateway node 15a with a response message M2. This message might comprise information about local CDN nodes 21b-21h located in the mobile network (MN) that can and/or can't be selected. The message M2 might comprise information about cache node(s) located in the radio access network (whether such node can/can't be used for the UE with the request content).

The gateway node 15a enriches the DNS request message S2 from the UE10 by additional edge node selection policy obtained from the PCRF 16 and UE mobility information and sends the corresponding enriched DNS request message M3 to the DNS server 23.

By taking into account of additional info provided by mobile network, the central CDN node 22 selects an appropriate edge node out of a plurality of edge nodes 21a-21h to serve the UE 10 and sends a selection message M5 comprising the IP address of the selected edge server to the gateway node 15a, that forwards a DNS response message S4 back to the UE 10, the DNS response message S4 comprising the address information of the selection message M5, so that the UE 10 is able to initiate a communication with the selected edge node 21.

By way of example, the additional information is a speed information of the UE (actual speed or averaged speed over a certain time period) for a low speed moving UE (e.g. a UE moving with a speed below a certain speed threshold), a service edge node closer to UE 10 is selected, i.e. an edge node located in RAN. For a high speed moving UE (e.g. a UE moving with a speed above the certain speed threshold), a service node closer to Gi/SGi, i.e., an edge node located in the core network (CN) or above Gi/SGi is selected (For example the threshold might be chosen as an explicit speed (e.g. 100 kmh, or as a certain number of cell handovers (HO) within a certain time, as it might be desired that during a file download from a cache, occurrences of HO are mostly avoided).

Figure 4:
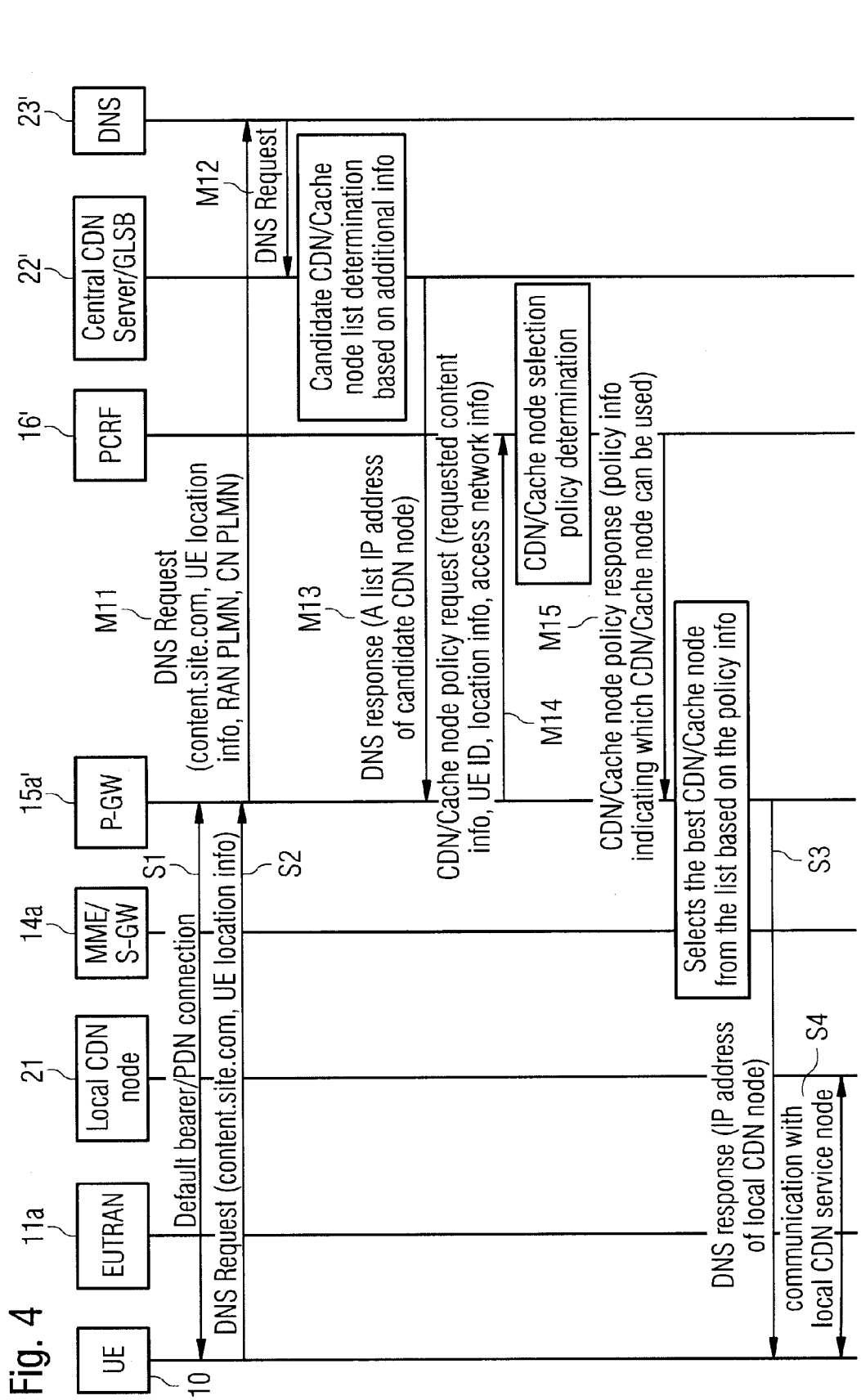
FIG. 4 shows a second exemplary sequence diagram for an edge node selection with assistance of a CDN system.

FIG. 4 shows an exemplary sequence diagram for an edge node selection with assistance of a CDN system.

This embodiment by way of example involves the same UE 10, radio access network 11, local service node 21 and MME/S-GW 13. Further, messages S1-S4 are similar with respect to FIG. 3. The embodiment according to FIG. 4 further involves modified gateway node 15a' modified policy server 16', modified central CDN server 22' and modified DNS 23'. Further, instead of messages M1-M5, alternative messages M11-M15 are proposed.

Similarly to FIG. 3, upon an establishment of a default bearer (PDN Connection) S1 between the UE 10 and the (modified) gateway node 15a', the UE 10 initiates a DNS request message S2 to get the IP address of an appropriate content server/local CDN node or edge server 21. Similar to FIG. 1, as an option, the UE may enrich the DNS message additionally with mobility information (actual location, actual speed, history of location, history of speed) cell ID, base station ID, RAC, TAC, or (CAC) caching area code in order to further assist or enable the DNS system to find an appropriate server to serve the UE.

The (modified) gateway node 15a' detects the DNS request from the mobile UE 10, (adds information sends a corresponding DNS request M11 to the (modified) DNS 23'. This message may include information indicative of the UE ID, the requested content/service, UE mobility location and/or RAN PLMN and CN PLMN (for example, content information may directly derived from the URL, UE location info may be related to all or any one of the cell ID, base station ID, Cache area ID, S-GW/SGSN ID, PLMN ID indicative of the operator of the mobile network. Mobility info can be information indicative of whether the mobiles moves with high speed or low speed or of HO times within a certain time period on cell level, base station level, S-GW/SGSN level).

The DNS 23' notifies the (modified) central CDN server 22' of the CDN system by forwarding the DNS request information by sending a notification message M12.

By taking additional info provided by the mobile network, the central CDN server 22' in turn selects an appropriate edge node to serve the UE. (Similar to FIG. 1, for a low speed moving UE, a service edge node closer to UE might be selected, and for a high speed moving UE, a service node closer to Gi/SGi may be selected). In case an edge node located in mobile network is selected, the central CDN server 22' establishes a list of candidate edge nodes (optionally arranged by priority) for the mobile network to determine the best one or an appropriate one according to certain criteria, e.g. being in line with mobile network operators' policy, and sends a corresponding DNS response message M13 back to the gateway node 15a'.

Upon reception of the DNS response message comprising the list of candidate edge nodes, then the gateway node 15a' initiates a process to request the related edge node selection policy for the UE regarding the related content/service by sending a request message M14 to the (modified) policy server 16'. This message may include information indicative of the UE ID, requested content/service, UE mobility (location, speed etc.)

The policy server 16' generates the edge node selection policy related to the UE 10 by considering at least one of: UE location, requested content/service, and possible subscription info. The selection policy might indicate, if the CDN distribution node located in or associated to the mobile network can or can't be selected, and/or if the cache node located in or associated to in the RAN can or can't be used for the UE 10 regarding the request content.

The policy server 16' sends a corresponding response message M15 indicative of the edge node selection policy related to UE back to the gateway server 15a' that finally selects an edge node from the list of edge node taking into account the received policy information M15.

Similar to FIG. 1, the gateway node 15a' forwards the DNS response message S4 back to the UE 10, the DNS response message S4 comprising an address information to enable the UE 10 to initiate a communication with the selected edge node 21.

The invention claimed is:

1. A method, in a communications network, for providing a service associated to a service request received from a mobile user equipment (UE), the communications network comprising a plurality of service nodes and a gateway node, wherein the gateway node performs the following steps:
   forwarding the service request received from the UE to a domain name server, wherein the service request comprises a domain name system (DNS) request to be resolved by the domain name server;
   receiving DNS response message from a selection server, said DNS response message comprising a list of one or more of the plurality of service nodes;
   contacting a policy server to request a service node selection policy, the request comprising the mobility information associated with the UE;
   receiving a policy response message from the policy server comprising service node information indicative of usability of the one or more of the plurality of service nodes; and
   selecting or initiating selecting a service node from the one or more service nodes in dependency of the service node information for providing the service associated with the service request.

2. The method of claim 1, wherein the gateway node forwards the service node information to a selection server of the communications network and in response receives an information indicative of the selected service node that has been selected by the selection server in dependency on the service node information.

3. The method of claim 1, wherein the gateway node performs: providing the mobility information to the selection server of the communications network, in response receiving the list of the one or more service nodes that can be contacted to provide the service; and selecting one service node out of said list in dependency on the service node information received from the policy server.

4. The method according to claim 1, wherein the gateway node adds the mobility information or a part of the mobility information to form an enriched DNS request and forwards the enriched DNS request to the domain name server to be further provided to the selection server.

5. A computer program loadable into a processing unit of a gateway node, the computer program comprising code adapted to execute the method of preceding claim 1.

6. A method, in a communications network, for providing a service associated to a service request received from a mobile user equipment (UE), the communications network comprising: a plurality of service nodes and a policy server, wherein the policy server performs the following steps:
   receiving from a gateway node a request for a service node selection policy in response to a domain name system (DNS) response message being received by the gateway node from a selection server, wherein the request for service node selection policy comprises information indicative of mobility information associated with the UE, and wherein said DNS response message comprises a list of one or more of the plurality of service nodes; and
   transmitting a policy response message to the gateway node, the policy response message comprising service node information indicative of usability of the one or more of the plurality of service nodes for selection of a service node from the one or more service nodes in dependency of the service node information to provide the service associated with the service request.

7. The method according to claim 6, wherein the request further comprises information indicative of the related service or application associated to the request from UE, and UE identity information.

8. A computer program loadable into a processing unit of a policy server, the computer program comprising code adapted to execute the method of preceding claim 6.

9. A gateway server operable in a communications network to provide a service associated to a service request received from a mobile user equipment (UE), the communications network comprising a plurality of service nodes, said gateway server comprising:
   a communications interface for:
      forwarding the service request received from the UE to a domain name server, wherein the service request comprises a domain name system (DNS) request to be resolved by the domain name server,
      receiving DNS response message from a selection server, said DNS response message comprising a list of one or more of the plurality of service nodes, and
      communicating with a policy server to send a policy request and to receive a corresponding policy response; and
   a processor adapted to:
      generate the policy request in response to the service request, said policy request comprising mobility information of the UE,
      process the policy response, and
      generate a service response indicative of a service node selected from the one or more of the plurality of service nodes in dependency of the policy response, wherein said service response is sent to the UE for providing the service associated to the service request.

10. A policy server operable in a communications network to provide a service associated to a service request received from a mobile user equipment (UE), the communications network comprising a plurality of service nodes, said policy server comprising:

a communications interface for communicating with a gateway server to receive a policy request and to send a corresponding policy response, wherein the policy request is received in response to a domain name system (DNS) response message being received by the gateway server from a selection server, and wherein said DNS response message comprises a list of one or more of the plurality of service nodes; and a processor adapted to:

process mobility information comprised in the policy request, and generate the policy response in dependency of the mobility information in order to support the gateway server in selecting a service node from the one or more of the plurality of service nodes to serve the service request of the UE.

* * * * *